United States Patent [19]

Merzweiler

[11] 3,864,860

[45] Feb. 11, 1975

[54] TIRE DISPLAY APPARATUS

[75] Inventor: Leo A. Merzweiler, Bath, Ohio

[73] Assignee: Summit Plastic Corporation, Tallmadge, Ohio

[22] Filed: May 31, 1973

[21] Appl. No.: 365,473

[52] U.S. Cl.............................. 40/125 M, 40/129 B
[51] Int. Cl........................................... G09f 21/04
[58] Field of Search ........... 40/125 M, 129 B, 20 A; D12/208

[56] References Cited
UNITED STATES PATENTS

| | | | |
|---|---|---|---|
| 2,042,416 | 5/1936 | Weindel | 40/20 A |
| 2,912,278 | 11/1959 | Lyon | 40/129 B UX |
| 3,481,652 | 12/1969 | Mazerolle | 40/129 B X |
| 3,763,584 | 10/1973 | Falkenstein | 40/125 M |
| 3,771,851 | 11/1973 | Heenan et al. | 40/20 A X |

Primary Examiner—Robert W. Michell
Assistant Examiner—John F. Pitrelli
Attorney, Agent, or Firm—Frederick K. Lacher

[57] ABSTRACT

A tire display disc of relatively stiff sheet material having two concentric annular flanges at the edge for mounting of the disc on two sizes of tires. The annular flanges have tapered surfaces for gripping by the resilient edges of the bead portions when the disc is inserted into the openings within the bead portions of the tires.

6 Claims, 5 Drawing Figures

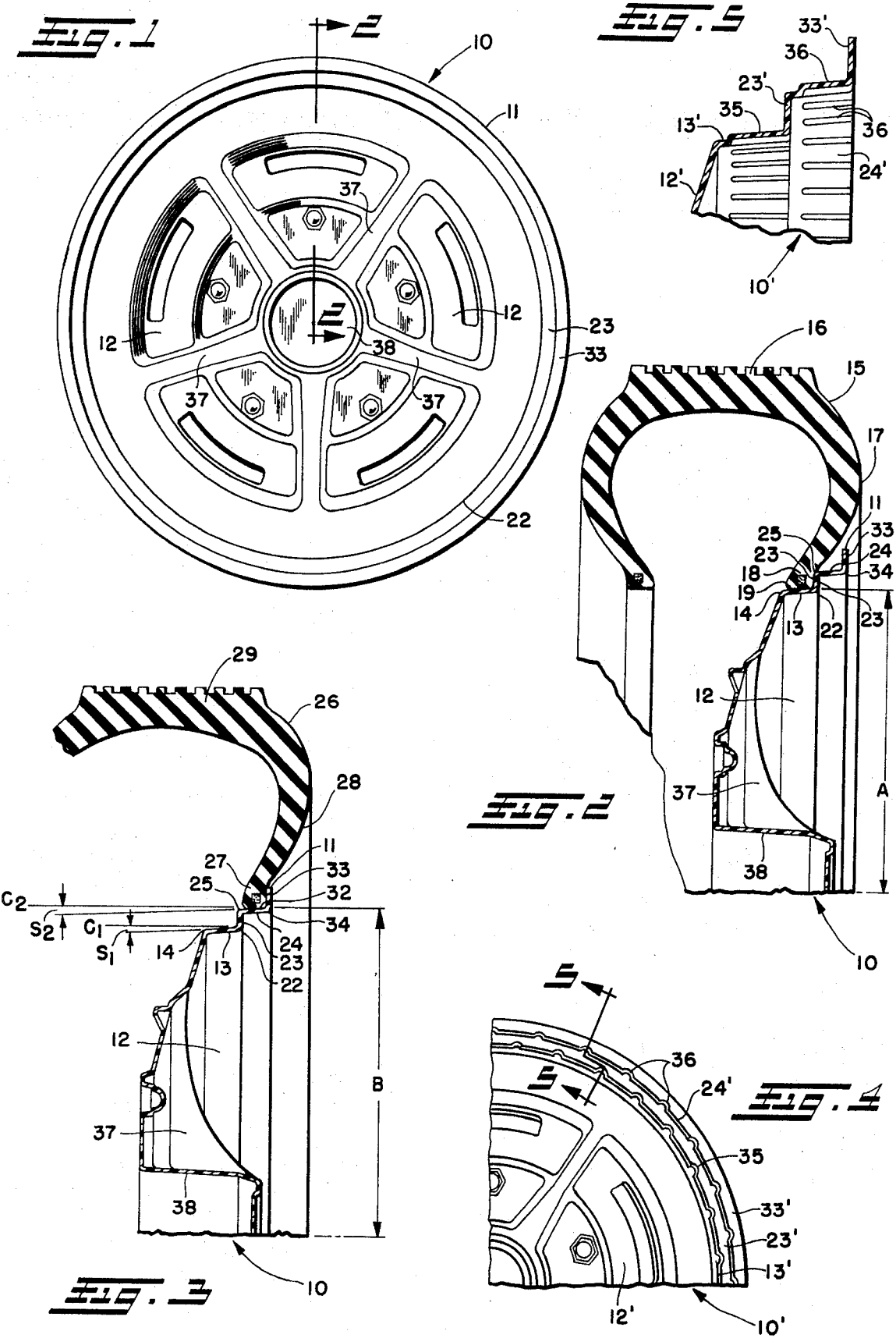

3,864,860

TIRE DISPLAY APPARATUS

BACKGROUND OF THE INVENTION

This invention relates to tire display discs which are made to simulate automobile wheels and are mounted on tires for display in tire stores. Tire display discs of this type give the customer a better idea of how the tires will look on his car and have been found to be a valuable sales aid in merchandising tires. Heretofore, the discs used have been fastened to the tires by removable spring clips. It has been found that display discs of this type are frequently dislodged from the tires and considerable time is required by the dealer remounting the discs. This also presents a problem when the discs must be cleaned since, here again, they are easily dislodged from the tire and time is consumed remounting the disc during or after cleaning. There has also been a problem caused by the loss of the clips and replacement thereof.

SUMMARY OF THE INVENTION

In accordance with the present invention, a tire display disc is provided which can be mounted in a tire without the need for separate clips. The disc has different sizes annular flanges for mounting on different size tires and the rims on the discs limit the insertion of the flanges into the tire openings. The disc has a stiffness for resisting the resilient action of the tire bead portions against the flanges and thereby provides a gripping of the disc by the tire to hold the disc in place. The flanges may be tapered to further increase this gripping action and may also have axially extending ribs to supplement this gripping action.

To the accomplishment of the foregoing and related ends, the invention, then, comprises the features hereinafter fully described and particularly pointed out in the claims, the following description and the annexed drawings setting forth in detail a certain illustrative embodiment of the invention and a modification thereof, this being indicative, however, of but two of the various ways in which the principles of the invention may be employed.

BRIEF DESCRIPTION OF THE DRAWINGS

In the drawings:

FIG. 1 is a front elevational view of the tire display disc.

FIG. 2 is a sectional view taken along the plane of line 2—2 of FIG. 1 showing the disc mounted in a tire of one size, with parts being broken away.

FIG. 3 is a sectional view like FIG. 2 showing the disc mounted on a second size tire, with parts being broken away.

FIG. 4 is a segmental front elevational view of a modification of the disc embodying the invention.

FIG. 5 is a sectional view taken along the planes of line 5—5 of FIG. 4, with parts being broken away.

DETAILED DESCRIPTION

Referring to FIG. 1, a tire display such as disc 10 is shown having an outer peripheral edge 11 and a central disc 12 which may be shaped to look like an automobile wheel. The disc 10 may be made of any suitable material having the necessary rigidity for insertion in a tire and is preferably of a thermoplastic material such as high impact styrene. it is desirable that the thickness of the disc 10 be kept to a minimum to reduce the weight for handling and shipping and to provide a low cost of manufacture. The disc 10 of this embodiment has a thickness of approximately 0.030 inch.

As shown more clearly in FIGS. 2 and 3, the disc 10 has a first annular flange 13 with an inner edge 14 where the flange and central disc 12 are joined. The inner edge 14 also is the first edge to enter a first size tire 15, as shown in FIG. 2. The tire 15 has a crown portion 16 and a sidewall 17 extending radially inward from the crown portion to a bead portion 18. A central opening 19 within the bead portion 18 has a radius indicated by A in FIG. 2. In the embodiment shown in FIG. 2, the central opening 19 has a diameter of 14 inches and accordingly the radius A is 7 inches.

The first annular flange 13 extends in an axial direction approximately the width of the bead portion 18 to an outer edge 22 which is joined to a radially extending first rim 23, overlapping the bead portion and restricting movement of the disc 10 into the central opening 19 of the tire 15. A second annular flange 24 is joined to the first rim 23 at an inner edge 25 and is adapted to fit in a second size tire 26, as shown in FIG. 3. A bead portion 27 of the tire 26 is connected by a sidewall 28 to a crown portion 29. A central opening 32 of the tire 26 is defined by the bead portion 27. As shown in FIG. 3, the second annular flange 24 fits within the bead portion 27 of the tire 26 and the central opening 32 has a radius indicated by letter B. The central opening 32 of the tire 26, shown in FIG. 3, has a diameter of 15 inches and therefore the radius B is equal to 7½ inches. The second annular flange 24 extends axially away from the first rim 23 and inner edge 25 to a second rim 33 extending axially from an edge 34 where the second annular flange 24 and second rim are joined to the edge 11 of the disc 10. The second rim 33 restricts the axial movement of the disc 10 into the tire 29 by engagement of the rim with the side of the bead portion 27.

The first annular flange 13 has a radius substantially the same as the radius of the corresponding bead portion 18 of the fist size tire 15, shown in FIG. 2. The second annular flange 24 has a radius substantially equal to the radius B of the bead portion 27 of second size tire 26, shown in FIG. 3. The first annular flange 13 and second annular flange 24 may also be tapered with the surfaces of the flanges, indicated by lines S1 and S2 in FIG. 3, sloping from the cylindrical surface, indicated by lines C1 and C2 in FIG. 3, in the amount of approximately one-quarter inch per foot. This configuration of the flanges 13 and 24 substantially conforms to the shape of the beads 18 and 27 which have resilient surfaces and edges for gripping of the disc 10.

With reference to FIGS. 4 and 5, a modification in which the construction is the same as that of the disc 10, shown in FIGS. 1, 2 and 3, with the addition of axially extending ribs 35 in the first annular flange 13' and axially extending ribs 36 in the second annular flange 24'. The ribs 35 and 36 extend axially of the flanges 13' and 24' and are spaced at positions circumferentially of the flanges. The ribs 35 and 36 may be formed in the sheet material of the disc 10' and may extend radially outward from the surfaces of the flanges 13' and 24' approximately one-sixteenth of an inch. They may have a width of approximately one-eighth inch and be spaced apart at intervals of approximately 1 inch. With this construction, the ribs 35 and 36 engage the resilient surfaces of beads 18 and 27 of the different size tires 15 and 26 providing an increased gripping action on the disc 10'.

The discs 10 and 10' of this invention are preferably vacuum formed from a thermoplastic material such as high impact styrene and it is desirable to keep the thickness at a minimum to reduce the costs of manufacture and handling. With the construction described above, the annular flanges 13 and 24 and rims 23 and 33 not only make it possible to use the display disc on two sizes of tires but also give the disc increased structural rigidity, making possible a construction in which the thickness of the disc is held to a minimum. The central disc 12 is also shaped with spokes 37 and a central hub 38 further providing rigidity to the thin wall construction. While certain representative embodiments and details have been shown for the purpose of illustrating the invention, it will be apparent to those skilled in the art that various changes and modifications may be made therein without departing from the spirit or scope of the invention.

I, therefore, particularly point out and distinctly claim as my invention:

1. A display for mounting on tires of the type having a toroidal shape with a crown portion, sidewalls extending radially inward from the crown portion and terminating in bead portions surrounding a central opening, comprising a first annular flange extending axially of the display, a first rim joined to said first flange and extending radially outward to a second annular flange extending axially away from said first rim, a second rim joined to said second annular flange at a position spaced from said first rim and extending radially outward, said first annular flange having a diameter substantially the same as the diameter of the bead portions of a first size tire for insertion into the central opening of said first size tire, said first rim having an outer diameter greater than the diameter of the bead portions to restrict insertion of said first flange into the opening, said second annular flange having a diameter substantially the same as the diameter of the bead portions of a second size tire for insertion into the central opening of the tire, said second rim having an outer diameter greater than the diameter of the bead portions of said second size tire to overlap the surface of the bead portions and restrict insertion of said second flange into the opening whereby said display may be mounted on said first size tire or said second size tire.

2. The display according to claim 1 wherein said first annular flange is joined to a central disc.

3. The display according to claim 1 wherein said first annular flange and said second annular flange have axially extending ribs at spaced-apart positions circumferentially of the flanges for engagement with the bead portions of the tires.

4. The display according to claim 1 wherein said display is a formed sheet of substantially stiff plastic material having a thickness of approximately 0.030 inches.

5. The display according to claim 1 wherein said first flange and said second flange have surfaces tapering from smaller diameters at the edges which enter the tire openings first to larger diameters at the edges joined to the rims which overlap the bead portions.

6. The display according to claim 5 wherein said tapering of said flange surfaces is approximately one-quarter inch per foot.

* * * * *